United States Patent [19]

Rabl et al.

[11] Patent Number: 4,990,788
[45] Date of Patent: Feb. 5, 1991

[54] APPARATUS EMITTING AN ELECTROMAGNETIC RADIATION

[75] Inventors: Ari Rabl, Montgeron; Denis Clodic, Paris; Robert Dehausse, Joinville Le Pont, all of France

[73] Assignee: A.R.M.I.N.E.S., Paris, France

[21] Appl. No.: 275,000

[22] Filed: Nov. 22, 1988

[30] Foreign Application Priority Data

Nov. 25, 1987 [FR] France ............................ 87 16360

[51] Int. Cl.⁵ .......................... G02B 5/10; F21V 7/04; F21V 7/12; F21V 7/20
[52] U.S. Cl. .............................. 250/504 R; 250/494.1; 250/495.1; 250/503.1; 250/505.1; 350/628; 350/630
[58] Field of Search ............. 250/504 R, 503.1, 495.1, 250/494.1, 505.1; 350/628, 630

[56] References Cited

U.S. PATENT DOCUMENTS

| | | | |
|---|---|---|---|
| 4,130,107 | 12/1978 | Rabl et al. | 350/628 |
| 4,327,969 | 5/1982 | Giutronich et al. | 350/630 |
| 4,596,935 | 6/1986 | Lumpp | 250/504 R |

FOREIGN PATENT DOCUMENTS

| | | |
|---|---|---|
| 523741 | 12/1982 | Australia . |
| 2343263 | 9/1977 | France . |
| 1110073 | 4/1968 | United Kingdom . |

Primary Examiner—Jack I. Berman
Attorney, Agent, or Firm—McAulay Fisher Nissen & Goldberg

[57] ABSTRACT

This invention relates to an apparatus emitting electromagnetic radiation, particularly infrared, which comprises a cylindrical source of rays and a reflector. In order to avoid the problem due to captive rays and to multiple reflections, the cross section of a half-reflector comprises, starting from the plane of symmetry, a first curved part constituted by an arc of involute to a circle extending from the plane of symmetry to an end located on a first extreme ray tangential to the source and passing through a first end of the target and a second curved part joined tangentially to the first curved part and of such shape that all the tangential rays emitted from the cylindrical source and falling on this second curved part are reflected towards the first end of the target located on the other side of the plane of symmetry.

6 Claims, 2 Drawing Sheets

APPARATUS EMITTING AN ELECTROMAGNETIC RADIATION

FIELD OF THE INVENTION

The present invention relates to an apparatus emitting an electromagnetic radiation, particularly infrared, comprising at least one cylindrical source of rays and a reflector.

BACKGROUND OF THE INVENTION

In an apparatus emitting electromagnetic radiation, particularly infrared, the reflector must be shaped and mounted with respect to the source of rays so that there are no rays captive between the source of the rays and the reflector. In fact, these captive rays are the cause of a loss of yield and local overheating. In addition, the shape and arrangement of the reflector must enable it to eliminate the multiple reflections between source and reflector which are naturally detrimental to the yield obtained with the apparatus.

An infrared radiation emitter apparatus is already known, as described in Pat. GB-A-1 110 073. This Patent relates more particularly to a reflector for a rectilinear infrared ray source, this reflector presenting a cross section symmetrical with respect to a plane and which is constituted, on each side of the plane of symmetry, by two arcs of parabola joined together by an intermediate curve constituting an arc of circle centered on the cylindrical source of infrared rays. In such an infrared radiation emitter apparatus, the particular shape of the cross section of its reflector does not make it possible to avoid rays captive between the source and the reflector, or to eliminate multiple reflections.

On the contrary, the present invention relates to an apparatus which makes it possible to satisfy these conditions and to obtain a particularly high yield with a remarkably simple structure.

SUMMARY OF THE INVENTION

To that end, this apparatus emitting an electromagnetic radiation, particularly infrared, comprising at least one cylindrical source of rays and a reflector for reflecting these rays emitted in the direction of a target defined as extending between two ends, the cylindrical source, the reflector and the target being symmetrical with respect to the same plane of symmetry of the emitter apparatus, so that the reflector is constituted by two halves of the same cross section located on either side of the plane of symmetry containing the longitudinal axis of the source, is characterized in that the cross section of a half-reflector, located on one side of the plane of symmetry, comprises, starting from this plane of symmetry, a first curved part constituted by at least one arc of involute to a circle or by an arc of circle extending from the plane of symmetry to an end located on a first extreme ray tangential to the source and passing through a first end of the target which is located on the other side of the plane of symmetry and a second curved part joined tangentially to the first curved part and of such shape that all the tangential rays emitted from the cylindrical source and falling on this second curved part are reflected towards the first end of the target located on the other side of the plane of symmetry, this second curved part terminating at an extreme point located on a second extreme ray tangential to the source and passing through the second end of the target which is located on the first side of the plane of symmetry.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
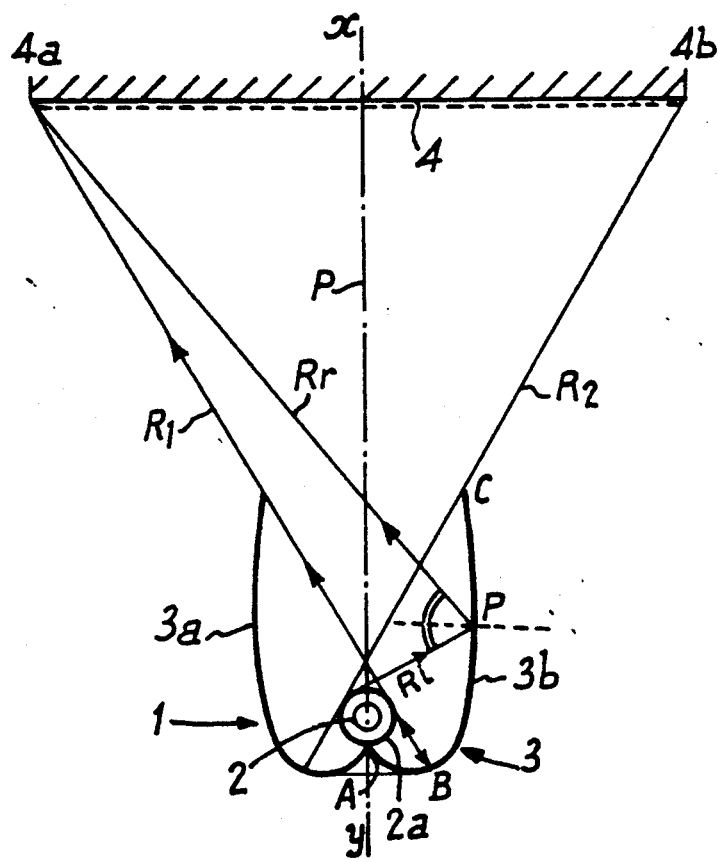
FIG. 1 is a schematic view in transverse section of an apparatus emitting infrared radiation according to the invention.

Referring now to the drawings, the radiation emitter apparatus shown in FIG. 1 which is symmetrical with respect to a plane xy perpendicular to the plane of the Figure, is generally designated by reference 1. This apparatus may emit any type of electromagnetic radiation, particularly light or infrared. In the following description, the apparatus will, however, be considered by way of non-limiting example as emitting an infrared radiation. This apparatus comprises a cylindrical source of infrared rays 2, such as a cylindrical tungsten filament, helically wound, surrounded by a coaxial cylindrical envelope 2a such as a quartz tube, and a reflector 3, and it projects an infrared radiation onto a target 4. Due to the symmetry of the emitter apparatus 1, the axis of the cylindrical source 2 is contained in the plane xy and the reflector 3 is constituted by two halfreflectors, namely a left-hand half-reflector 3a and a right-hand half-reflector 3b, symmetrical with respect to plane xy. The cross section of each of the half-reflectors 3a, 3b which have cylindrical surfaces, comprises two parts, namely a first curved part AB, in the form of an arc of involute to the circle called "emitter" circle which constitutes the cross section of the cylindrical source 2 and a second curved part BC. The end A of arc AB is located on the outer cylindrical envelope 2a of the infrared ray source 2, in the plane of symmetry xy of the apparatus and on the rear side, i.e. opposite the outlet aperture of the infrared radiation emitted by apparatus 1. The other end B of the arc AB lies on the extreme ray R1 which is tangential to the "emitter" circle 2 and which passes through the lefthand end 4a of the target 4, i.e. the one located on that side of the plane of symmetry xy opposite the one where the right-hand half-reflector 3b is located.

Since arc AB is an arc of an involute to the "emitter" circle forming the cross section of the winding cylinder of the emitter filament 2, all the tangential rays emitted by source 2 between the tangential point of the extreme tangential ray R1 and point A, are reflected on themselves at all points of arc AB.

The cross section of the right-hand half-reflector 3b comprises a second curved part BC which is joined tangentially to the first curved part AB at point B. The shape of this second curved part BC is such that all the tangential rays emitted from the "emitter" circle 2 and falling on this curved part BC are reflected towards the left-hand end 4a of the target 4. FIG. 1 shows a tangential ray Ri emitted from the cylindrical source 2 and which strikes the right-hand half-reflector 3b at a point P from which it is reflected in the form of a ray Rr attaining the left-hand end 4a of the target 4.

Point C which constitutes the end of the second curved part BC is located on the extreme ray R2 which is tangential to the "emitter" circle 2 and which passes through the right-hand end 4b of the target 4, i.e. the one located on the same side as the right-hand half-reflector 3b with respect to the plane of symmetry xy.

From the foregoing description, it may be seen that each of the half-reflectors 3a, 3b makes it possible to avoid, due to the particular shape of its cross section, multiple reflections between source and reflector and the captivity of some rays between the source 2 and the reflector 3, which thus avoids local overheating and considerably increases the yield of the apparatus.

Figure 2:
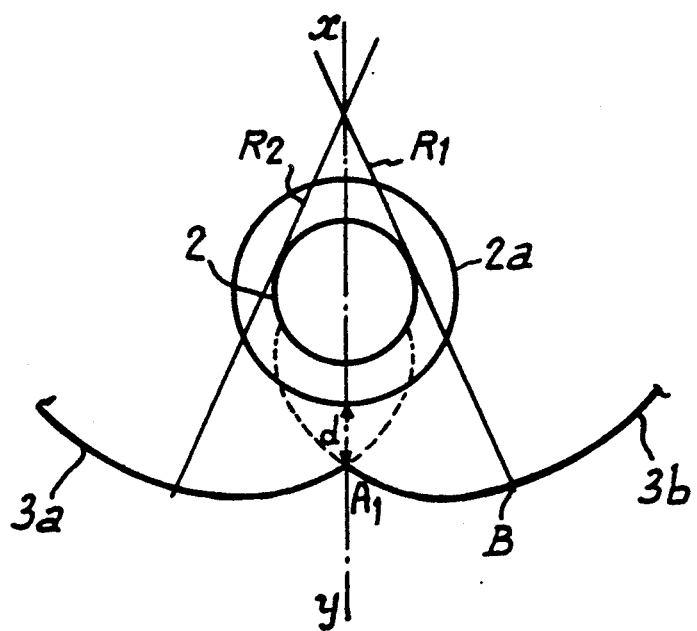
FIGS. 2, 3 and 4 are diagrams of variant embodiments of the infrared radiation emitter apparatus.

In the variant embodiment of the invention shown in FIG. 2, the end A1 of the first curved part A1B of the cross section of each half-reflector is not located on the outer cylindrical envelope 2a of the source 2, but at a certain distance d to the rear thereof. In that case, the involute to a circle of which part A1B constitutes only an arc, begins, on the surface of the cylindrical source 2, at a point a1 located to the left of the plane of symmetry xy.

Figure 3:
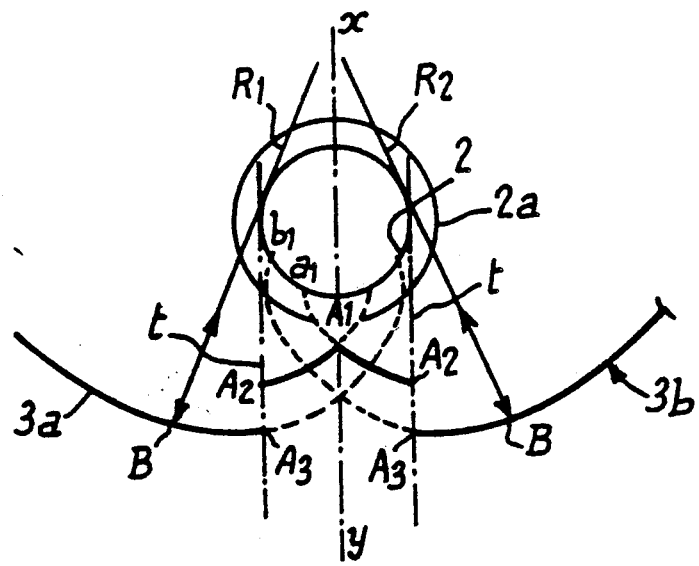

In the variant embodiment of the invention shown in FIG. 3, the first curved part of the cross section of each half-reflector 3a, 3b is constituted by two arcs of different involutes to the "emitter" circle, i.e. the cross section of the cylindrical source 2, namely arcs A1A2 and A3B. The end A1 of the arc of involute to circle A1A2 is close to the surface of the envelope 2a of the source 2, to the rear thereof in the plane of symmetry xy, and arc A1A2 is a portion of an involute to a circle starting from a point a1 located, on the outer surface of the cylindrical source 2, to the left of the plane of symmetry xy. Furthermore, the arc A3B is a portion of another involute to a circle starting from a point b1 located, on the outer surface of the cylindrical source 2, beyond, i.e. to the left of the point of departure a1 of the first involute to a circle. The ends A2 and A3 which are distant from each other are aligned along the same tangent t to the cylindrical source 2 which is parallel to the plane of symmetry xy so that no infrared ray is consequently lost. The space arranged between ends A2 and A3 thus constitutes an opening for the passage of air for cooling the apparatus according to the invention.

Figure 4:
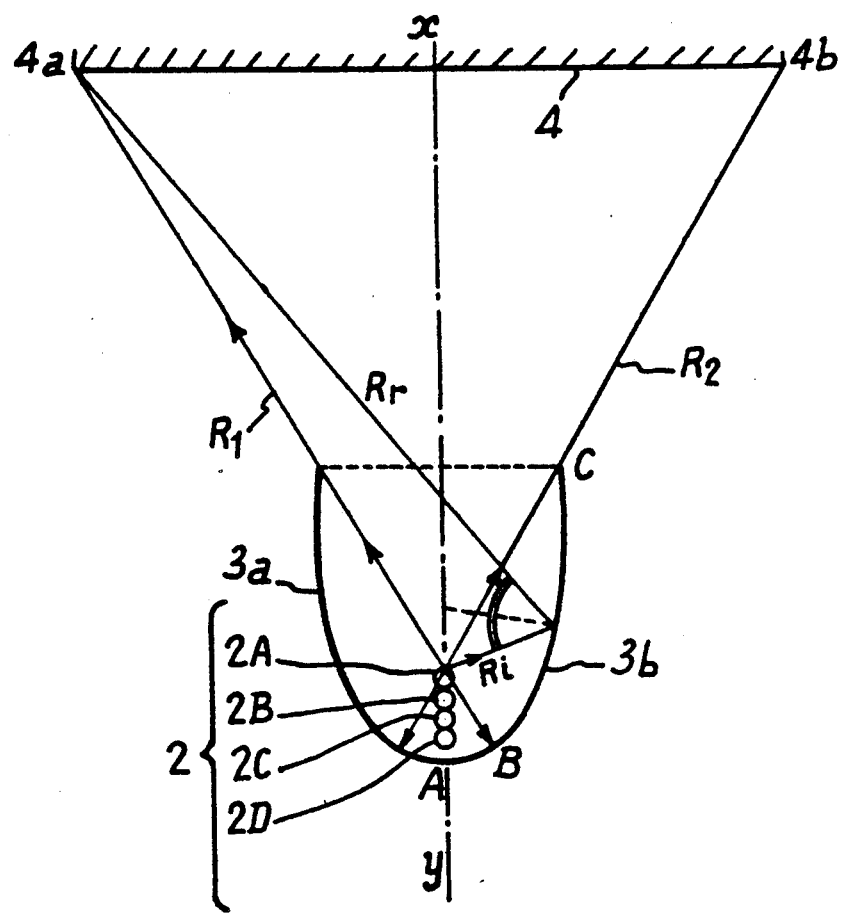

In the variant embodiment of the invention shown in FIG. 4, the source 2 of infrared rays is in fact constituted by a plurality of cylindrical elementary sources 2A, 2B, 2C, 2D, which are adjacent one another and whose axes are parallel and contained in the plane of symmetry xy. These elementary sources 2A-2D constitute the equivalent of a bifacial source of infrared radiation: in other words, they may be considered as a plane plate emitting infrared radiations from its two opposite faces. In that case, the first curved part AB of the cross section of each half-reflector 3a, 3b is constituted by an arc of circle centered substantially on the outer elementary source 2A, i.e. the one which is closest the outlet aperture of the apparatus. The end B is located, as in the preceding cases, on the extreme tangential ray R1 which passes through the left-hand end 4a of the target 4. The second curved part BC is constituted by an arc of ellipse having as its major axis the extreme tangential ray R1 and for a foci the outer elementary source 2A and the left-hand end 4a of the target 4. As before, the end C is located on the extreme tangential ray R2 which passes through the right-hand end 4b of the target 4.

The radiation emitter apparatus according to the invention may be used in the whole visible and invisible spectrum and it may in particular constitute a light beam projector mounted, for example, on an automobile vehicle.

What is claimed is:

1. In an apparatus emitting an electromagnetic radiation, particularly infrared, comprising:

at least one cylindrical source of rays and a reflector for reflecting these rays emitted in the direction of a target defined as extending between two ends, the cylindrical source, the reflector and the target being symmetrical with respect to the same plane of symmetry of the emitter apparatus, so that the reflector is constituted by two halves of the same cross-section located on either side of the plane of symmetry containing the longitudinal axis of the source;

the cross-section of a half reflector, located on one side of the plane of symmetry, comprises, starting from this plane of symmetry, a first curved part constituted by at least one arc of involute to a circle or by an arc of circle extending from the plane of symmetry to an end located on a first extreme ray tangential to the source and passing through a first end of the target which is located on the other side of the plane of symmetry, and a second curved part joined tangentially to the first curved part and of such shape that all the tangential rays emitted from the cylindrical source and falling on this second curved part are reflected towards a first end of the target located on the other side of the plane of symmetry, this second curved part terminating at an extreme point located on a second extreme ray tangential to the source and passing through the second end of the target which is located on the first side of the plane of symmetry; and a single cylindrical source of rays, wherein the first curved part is constituted by two arcs of different involutes to the "emitter" circle formed by the same cross-section of the cylindrical source, namely a first arc of involute to a circle extending between a first end located in the plane of symmetry and at a distance from the outer envelope of the cylindrical source and a second end, this first arc of involute to a circle forming part of an involute to a circle starting from a point, on the outer surface of the cylindrical source, which is located on the opposite side of the plane of symmetry, and a second arc of involute to a circle forming part of another involute to a circle starting from a point located, on the outer surface of the cylindrical source, beyond the first point of departure, the second end of the first arc of involute to the circle and the first end of the second arc of involute to the circle being distant from each other and aligned along the same tangent to the cylindrical source, which tangent is parallel to the plane of symmetry, so that the space arranged between these ends constitutes an opening for the passage of cooling air.

2. The apparatus of claim 1, wherein the first curved part is constituted by an arc of an involute of the "emitter" circle formed by the cross-section of the cylindrical source, starting from a point located on the outer envelope of the cylindrical source, in the plane of symmetry, to the rear thereof, i.e., opposite the outlet aperture of the apparatus.

3. The apparatus of claim 1, wherein the first curved part is constituted by an arc of an involute to a circle starting from a point which is located, in the plane of symmetry, at a distance from the outer envelope of the cylindrical source, to the rear thereof.

4. In an apparatus emitting an electromagnetic radiation, particularly infrared comprising:

at least one cylindrical source of rays and a reflector for reflecting these rays emitted in the direction of a target defined as extending between two ends, the cylindrical source, the reflector and the target being symmetrical with respect to the same plane of symmetry of the emitter apparatus, so that the reflector is constituted by two halves of the same cross-section located on either side of the plane of symmetry containing the longitudinal axis of the source;

the cross-section of a half reflector, located on one side of the plane of symmetry, comprises, starting from this plane of symmetry, a first curved part constituted by at least one arc of involute to a circle or by an arc of circle extending from the plane of symmetry to an end located on a first extreme ray tangential to the source and passing through a first end of the target which is located on the other side of the plane of symmetry, and second curved part jointed tangentially to the first curved part and of such shape that all the tangential rays emitted from the cylindrical source and falling on this second curved part are reflected towards the first end of the target located on the other side of the plane of symmetry, this second curved part terminating at an extreme point located on a second extreme ray tangential to the source and passing through the second end of the target which is located on the first side of the plane of symmetry; and said source of rays being constituted by a plurality of cylindrical elementary sources which are adjacent one another and whose axes are parallel and contained in the plane of symmetry, the first curved part of the cross-section of the half-reflector being constituted by an arc of circle centered substantially on the outer elementary source, i.e., the one which is closest the outlet aperture of the apparatus, and the second curved part is constituted by an arc of ellipse having as its major axis the first extreme tangential ray and for its foci the outer elementary source and the first end of the target.

5. The apparatus of claim 4, wherein the first curved part is constituted by an arc of an involute of the "emitter" circle formed by the cross-section of the cylindrical source, starting from a point located at the outer envelope of the cylindrical source, in the plane of symmetry, to the rear thereof, i.e., opposite the outlet aperture of the apparatus.

6. The apparatus of claim 4, wherein the first curved part is constituted by an arc of an involute to a circle starting from a point which is located, in the plane of symmetry, at a distance from the outer envelope of the cylindrical source, to the rear thereof.

* * * * *